P. D. Beckwith.
Plow-Gauge Wheel.
Nº 73564      Patented Jan. 21, 1868.
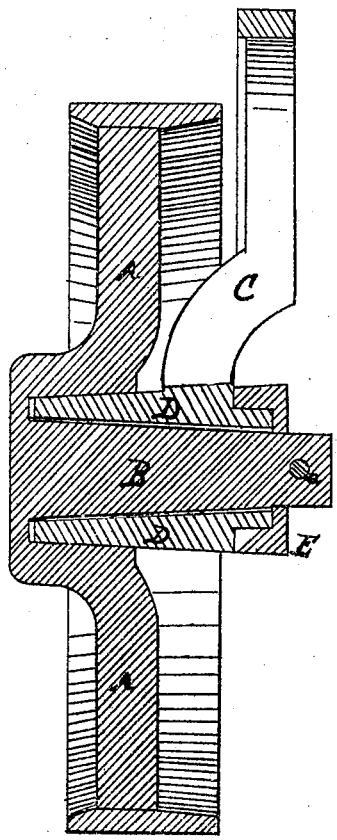
Witnesses             Inventor

United States Patent Office.

PHILO D. BECKWITH, OF DOWAGIAC, MICHIGAN.

Letters Patent No. 73,564, dated January 21, 1868.

IMPROVEMENT IN PLOUGH-GAUGE WHEELS.

*The Schedule referred to in these Letters Patent and making part of the same.*

TO ALL WHOM IT MAY CONCERN:

Be it known that I, PHILO D. BECKWITH, of Dowagiac, in the county of Cass, and in the State of Michigan, have invented a new and improved Plough-Gauge Wheel; and do hereby declare that the following is a full, clear, and exact description thereof, reference being had to the accompanying drawings, and to the letters of reference marked thereon.

In the annexed drawings, making part of this specification, A represents a wheel, which is to be used for supporting the forward end of a plough-beam. This wheel is cast with a socket or depression in one side at its centre, and from the centre of this socket projects a short shaft or skein, B, said shaft or skein being cast with and forming a part of the wheel. C represents a shank, which is cast with a slot in it near its upper end, through which it is secured and adjusted to the beam, and with a hub or box, D, upon its lower end. The hub on the lower end of the shank C is formed so that the axle B will fit snugly in it. The hub D is held upon the axle B by means of a collar, E, and a pin, e, which said pin passes into a hole in the outer end of the axle.

Having thus fully described my invention, what I claim as new, and desire to secure by Letters Patent, is—

1. The axle or skein B cast upon the wheel A, as and for the purpose set forth.
2. The shank C, with a hub cast upon its lower end, and used in combination with the wheel A and its axle B, substantially as herein set forth.

In testimony that I claim the foregoing, I have hereunto set my hand, this fourth day of December, 1867.

P. D. BECKWITH.

Witnesses:
    IDA HOLLISTER,
    N. B. HOLLISTER.